United States Patent [19]
Lorie

[11] Patent Number: 5,933,531
[45] Date of Patent: *Aug. 3, 1999

[54] VERIFICATION AND CORRECTION METHOD AND SYSTEM FOR OPTICAL CHARACTER RECOGNITION

[75] Inventor: Raymond Amand Lorie, San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,380

[22] Filed: Aug. 23, 1996

[51] Int. Cl.$^6$ .............................. G06K 9/34; G06K 9/62; G06K 9/72; G06F 11/00

[52] U.S. Cl. ......................... 382/229; 382/161; 382/178; 382/231; 382/311; 345/338; 395/183.14; 395/183.22

[58] Field of Search ..................................... 382/138, 161, 382/229, 231, 311, 178; 345/338, 468; 395/183.14, 183.22, 568

[56] References Cited

U.S. PATENT DOCUMENTS

| | | | |
|---|---|---|---|
| 3,969,698 | 7/1976 | Bollinger et al. | 340/146.3 |
| 4,674,065 | 6/1987 | Lange et al. | 382/311 |
| 4,979,227 | 12/1990 | Mittelbach et al. | 382/231 |
| 5,040,227 | 8/1991 | Lyke et al. | 382/138 |
| 5,151,948 | 9/1992 | Lyke et al. | 382/138 |
| 5,267,327 | 11/1993 | Hirayama | 382/161 |
| 5,739,850 | 4/1998 | Hori | 358/909.1 |

OTHER PUBLICATIONS

Amano, et al. "DRS : A Workstation–Based Document Recognition System for Text Entry", IEEE, vol. 25 issue 7, Jul. 1992.

Sinha, et al. "Hybrid Contextual Text Recognition With String Matching", IEEE, vol. 15, No. 9, Sep. 1993.

Downton, et al. "Syntactic and Contextual Post–Processing of Handwritten Addresses for Optical Character Recognition", IEEE, Jun. 1988.

Cohen, Computational Theory for Interpreting Handwritten Text in Constrained Domains, Elsevier, Artificial Intelligence 67, vol. 26, No. 1, Jul. 1994.

J. K. Mullin, InterfacingCriteria for Recognition Logic Used with a Context Post–Processor, Pattern Recognition Society, vol. 15, No. 3, pp. 271–273, 1982.

R. M. K. Sinha et al., Hybrid Contextual Text Recognition with String Matching, IEEE Transactions on Pattern Analysis and Machine Intelligence, vol. 15, No. 9, pp. 915–925, Sep. 1993.

(List continued on next page.)

Primary Examiner—Bipin H. Shalwala
Assistant Examiner—Daniel G. Mariam
Attorney, Agent, or Firm—James C. Pintner; McGinn & Gibb, P.C.

[57] ABSTRACT

An optical character recognition method and system are provided, employing context analysis and operator input, alternatively and in combination, on the same batch of documents. After automatic character recognition, the context analyzer processes the fields that are good enough to expect resolution. This will accept as many fields as possible without any operator intervention. For some other fields, the process uses operator input to certify the character-level OCR result of, or to enter, a certain percentage of the characters, so that context analysis may accept some of the remaining fields. If the context analyzer successfully identifies a small set of very close hypotheses, the process asks the operator to certify one or two characters to resolve the ambiguity between the hypotheses. For the fields that are still not resolved, the fields and the hypotheses are shown to the operator for acceptance, correction, or entry.

54 Claims, 10 Drawing Sheets

OTHER PUBLICATIONS

From Card to Marc, Vine, No. 48, pp. 26–30, Mar. 1985.

Ong and Lee, Knowledge–based Contextual Processor for Text Recognition, IEEE, Computer Society Technical Committee on Pattern Analysis and Machine Intelligence, (Proceedings) p. 465, Mar. 1993.

Siddiqui et al., Using Contextual postprocessing to Improve Machine Recognition. . . IEEE Int. Symp. on Information Theory, Absts. of Papers, p. 37, Sep. 1983.

Houle et al., Use of a Priori Knowledge for Character Recognition, SPIE vol. 1661, pp. 146–156, 1992.

Downton et al., Syntactic and Contextual Post–Processing of a Handwritten Addresses for Optical Character Recognition, IEEE 9th Internat. Conf. on pattern Recognition, vol. II, pp. 1072–1076, Nov. 1988.

Baird et al., Components of an Omnifont Page Reader, IEEE 8th Internat. Conf. on Pattern Recognition, pp. 344–348, Oct. 1986.

Borgman et al., Getty's Synoname and Its Cousins: A Survey of Applications of Personal Name–Matching Algorithms, Journal of the American Society for Information Science, pp. 459–476, 1992.

Fukunaga et al., Recognition of Words with Semantic Information, Electronics and Communications in Japan, vol. 59–A, No. 1 1976.

T. G. Rose et al., A Large Vocabulary Semantic Analyzer for Handwriting Recognition, AISB Quarterly, No. 80. pp. 34–39.

Recognition Technologies Under Discussion, Electronic Documents, vol. 2, No. 9, pp. 12–16.

Lecolinet, A New Model for Context–Driven Word Recognition, Proc. 2nd Ann. Symp. on Document Analysis and Information Retrieval, pp. 135–145.

G. Farmer, Automated Data Capture & Deposit System Utilizes OCR for Hand–printed Tax Forms, IMC Journal, vol. 28, #2, Mar/Apr., pp. 23–26, 1992.

M. M. Lankhorst et al., Automatic Word Categorization: An Information–theoretic Approach, (paper), Univ. of Groningen, The Netherlands.

R. A. Wilkinson & C. L. Wilson, Using Self–Organizing Recognition as a Mechanism for Rejecting Segmentation Errors, SPIE vol. 1825, Intelligent Robots and Computer Vision XI (1992), pp. 378–388.

P. B. Cullen, T. K. Ho, J. J. Hull, M. Prussak & S. N. Srihari, Contextual Analysis of Machine Printed Addresses, SPIE vol. 1661 (1992), pp. 257–268.

PHASE D:

PHASE E:

VERIFICATION AND CORRECTION METHOD AND SYSTEM FOR OPTICAL CHARACTER RECOGNITION

FIELD OF THE INVENTION

The invention generally relates to the field of optical character recognition (OCR). More specifically, the invention relates to a technique for efficiently combining automatic OCR functions with human intervention on an as-needed basis. The invention has particular applicability to systems which enter data that appears on printed and handwritten paper forms.

BACKGROUND OF THE INVENTION

The problem at hand is to recognize the textual information contained in a scanned image. The scanned images can come from a wide variety of source material, such as written answers to printed questions on forms, or mailing addresses on postal envelopes.

A form is a document which is easily partitioned into a fixed number of small fields, each having certain simple, syntactic and/or semantic properties. The data can be machine printed or hand printed. Typically, a machine-printed form has printed legends or instructions for the various fields, and a person filling out the form inserts information, in his/her handwriting, in the fields. Thus, both the machine-printed legends and instructions, and the handwriting, are present in the image of the form. OCR is performed to obtain the handwritten information.

OCR systems employ various strategies for isolating small portions of the image (such as groups of numeric digits within telephone numbers or ZIP codes) as connected components, segmenting a connected component into one or several character images and recognizing each such image as representing a specific character.

Conventional OCR recognition engines exist, which recognize characters with a reasonable accuracy. However, "reasonable accuracy" is generally not good enough: minor errors, such as an erroneous digit in a dollar value, can have devastating impacts on the user.

The OCR technology that is required to perform this job has made substantial progress in the last decade, but raw OCR results are still—and will remain, probably forever—relatively unreliable. A 98% recognition rate at the character level leaves many fields with an error. At 90% recognition rate, less than half of the words in a form are error-free. But 90% is even out of reach when the form is hand-printed or when the characters are not "boxed" (the latter situation often leading to segmentation errors).

In practically all cases, some form of error correction needs to be done after OCR. Therefore a practical system must include extra processing of some kind in order to improve the results, either automatically through the exploitation of context, or by supporting operator intervention to verify and correct the information.

An OCR system may be designed to identify several alternatives for segmenting a connected component, and several character choices for each character inside a segmentation alternative. The results are typically provided from the output of the OCR system to an application program, such as a text processor or a printer driver.

It is well known that the use of context information in conjunction with OCR helps to improve the level of accuracy realized. For instance, suppose some connected components are identified as making up a ZIP code (which consists only of a sequence of numeric characters). It will then be true that any character choice, for a character within the connected component, which is not a numeric character can be dismissed as an incorrect choice. Since a Zip code has a known number of digits, any character choice which would imply a different number of digits can be dismissed. Finally, since only a subset of the possible permutations of digits are actual Zip codes, valid and in use, any character choice which would imply an invalid Zip code may be dismissed.

In conventional systems, the OCR subsystem simply provides any character choices it recognizes to the application program, and the exploitation of context is performed by the application program. Either the application program performs error correction automatically, or it provides a user interface for operator intervention.

However, there are drawbacks in such an approach: speed and accuracy are not as satisfactory as they ideally could be. Therefore, the challenge facing OCR system designers is how to integrate character verification and correction with context checking, to improve the speed and accuracy of an automatic recognition system beyond that of conventional systems.

The technology of such post-OCR error correction has been limited to methods for performing a linear sequence of operations. For instance, an automatic step is performed, of invoking the recognizer and then checking for constraints to be verified. If a field does not satisfy the constraints, then the field is shown to an operator, who corrects it.

Another sequence may be to recognize the characters, and then rely on operator intervention to certify or re-enter individual characters that have been recognized with a confidence less than a certain threshold. Such a system works only at the character level. Field verification is done afterwards.

A variation of this technique includes certifying all characters, using the concept of carpets. Documents are recognized in a batch, and recognition is done for several hundreds or thousands of characters. Then, all characters recognized as '1' can be shown together on the screen, forming a "carpet". An operator easily recognizes (and clicks on) the misrecognized characters and corrects them. The same is done for all 2's, 3's etc. This method is efficient only if a very high percentage of the characters are recognized correctly (97–98% range). Because of this requirement, the method, when used alone, is of little help for handwritten letters. Of course, checking the constraints can always be done afterwards.

Another technique is described in co-pending, co-assigned U.S. patent application Ser. No. 08/325,849, Lorie, "Optical Character Recognition System Having Context Analyzer." This system uses both syntactical and semantic rules.

However, these prior art methods have in common the fact that they are limited to performing operations in a predetermined order.

If, after recognition, characters that are doubtful are presented to an operator for character-level verification or re-entry, the system over-emphasizes the importance of correctly identifying individual characters, and fails to make the most effective use of the contextual information that is available.

On the other hand, if the system immediately rushes into context exploitation, it may do so on results that are excessively poor, so that the contextual correction process is mis-led by the errors, and applies incorrect contextual information. The result is that correct characters may be "corrected" to incorrect values because of the inappropriate contextual information.

Because of these factors, the conventional context analyzer will perform poorly and will be slow. This is particularly true of fuzzy searches of dictionaries. Since no character is absolutely certain, it is difficult to use indexing to address directly a subset of the entries in the dictionaries.

SUMMARY OF THE INVENTION

It is therefore an object of the invention to improve OCR results before exploiting contextual information, to improve helps speed and accuracy.

It is a further object of the invention to take advantage of characters whose recognition is known with relatively high probability.

To achieve these and other objects, there is provided in accordance with the invention a technique which uses a much tighter integration, between context and operator verification and correction, than has been used conventionally.

A method in accordance with the invention eliminates the drawbacks described above by integrating verification and context analysis in a novel way.

The method of the invention employs context analysis and operator input alternatively, on the same batch of documents. After character recognition, the context analyzer processes the fields that are good enough to expect resolution. This will accept as many fields as possible without any operator intervention.

For some other fields, the process uses operator input to certify the character-level OCR result of (or enter) a certain percentage of the characters so that context analysis may accept some of the remaining fields.

If the context analyzer succeeds to identify a small set of very close hypotheses, the process asks the operator to certify one or two characters to resolve the ambiguity. For the fields that are still not resolved, the fields (and the hypotheses) can be shown for acceptance, correction, or entry.

The process may differ according to the type of fields. Therefore, it is controlled by some user-specified, field-dependent, parameters.

The method according to the invention uses a combination of carpets and batching. This means that a certain number of forms are handled together. The batch goes through a succession of phases that alternate computation intensive phases with operator-assisted phases. Each phase stores and updates information in a workspace. At the end of the process, the workspace contains the values that have been recognized at a specified level of confidence.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

OVERVIEW OF INVENTION

It is contemplated that the method of the invention is to be practiced in an environment (FIG. 1) in conjunction with a recognizer 2 that returns multiple choices for each character. Alternatively, a recognizer 2 may return one or more interpretations of a connected component (no split, split into two characters, three characters, etc.). For each of the letters in these interpretations, the recognizer produces several character hypotheses, each hypothesis having a respective confidence level. These are provided to a verification and correction system 4 in accordance with the invention.

Given these outputs from the recognizer 2, the system 4 invokes the context analysis or an interactive function, in an order determined by the results and by a series of control parameters specified by the application designer.

Figure 1:
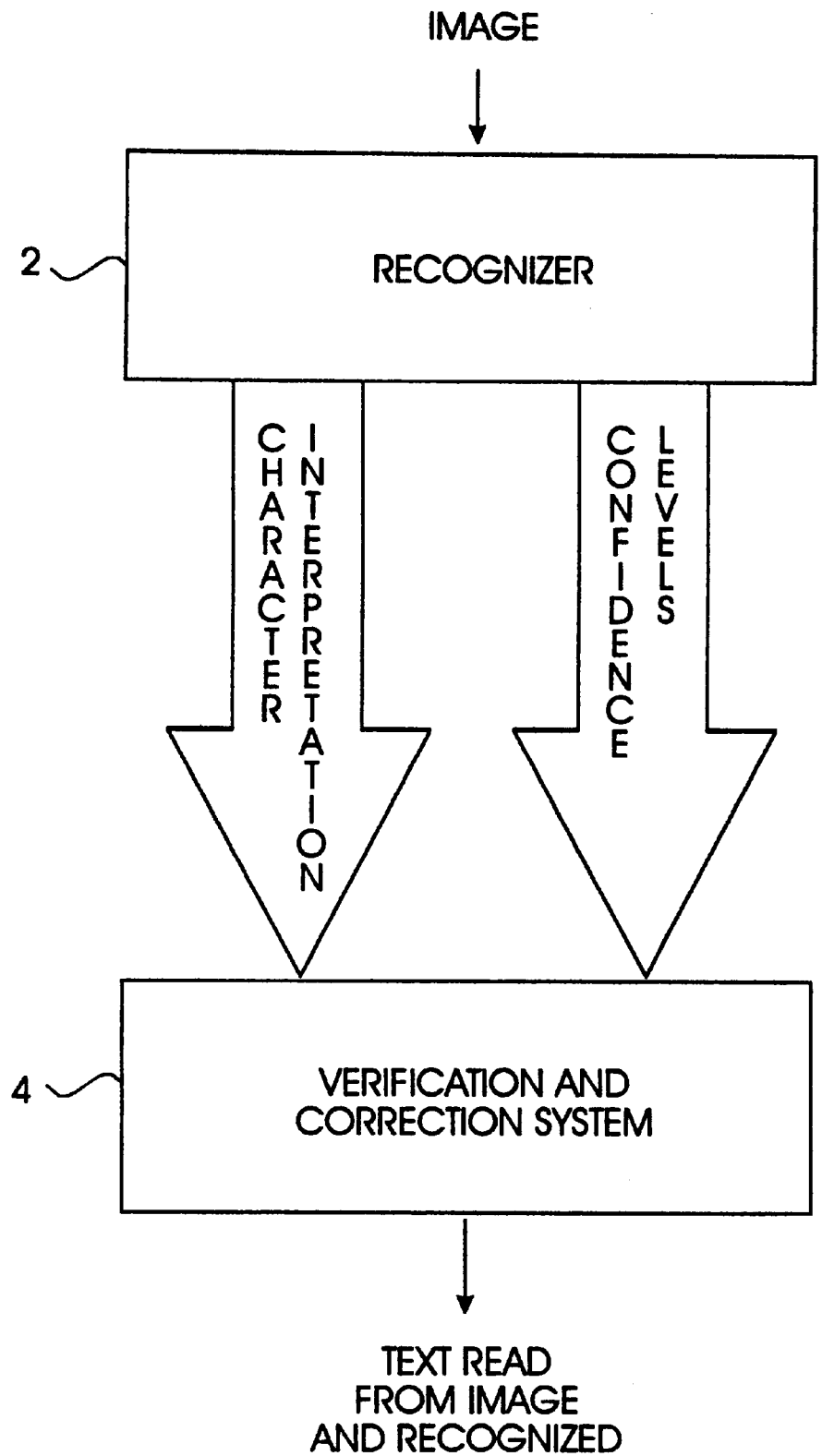
FIG. 1 is a high level block diagram showing a system according to the invention in an operating environment.
Figure 2:
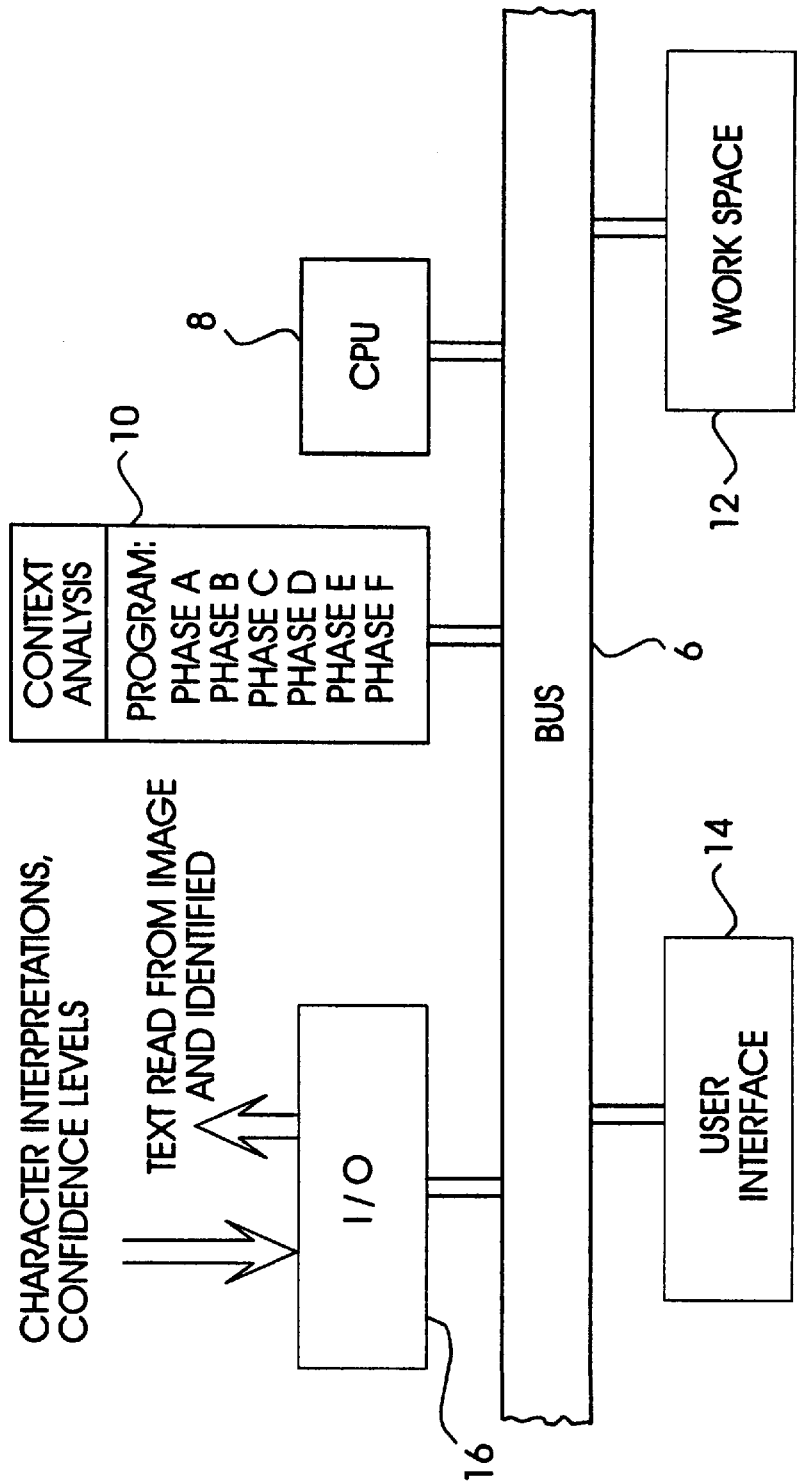
FIG. 2 is a more detailed block diagram of a system according to the invention.

FIG. 2 is a more detailed block diagram of the system 4 of FIG. 1, showing a typical configuration of components for realizing the invention. The system includes a bus 6 for communicatively coupling the other components, a CPU 8, a program store 10, and a workspace 12, such as allocated disk storage space or random-access memory (RAM). A user interface 14 is provided for allowing a user to examine intermediate results and to make appropriate entries of characters or decisions, as will be explained below. The user interface 14 typically includes a display and a keyboard and/or mouse.

Input and output, shown schematically as 16, represent the information input to the system 4 (as shown in FIG. 1), and the results output from the system 4, including text which was read from the image and recognized.

Figure 3:
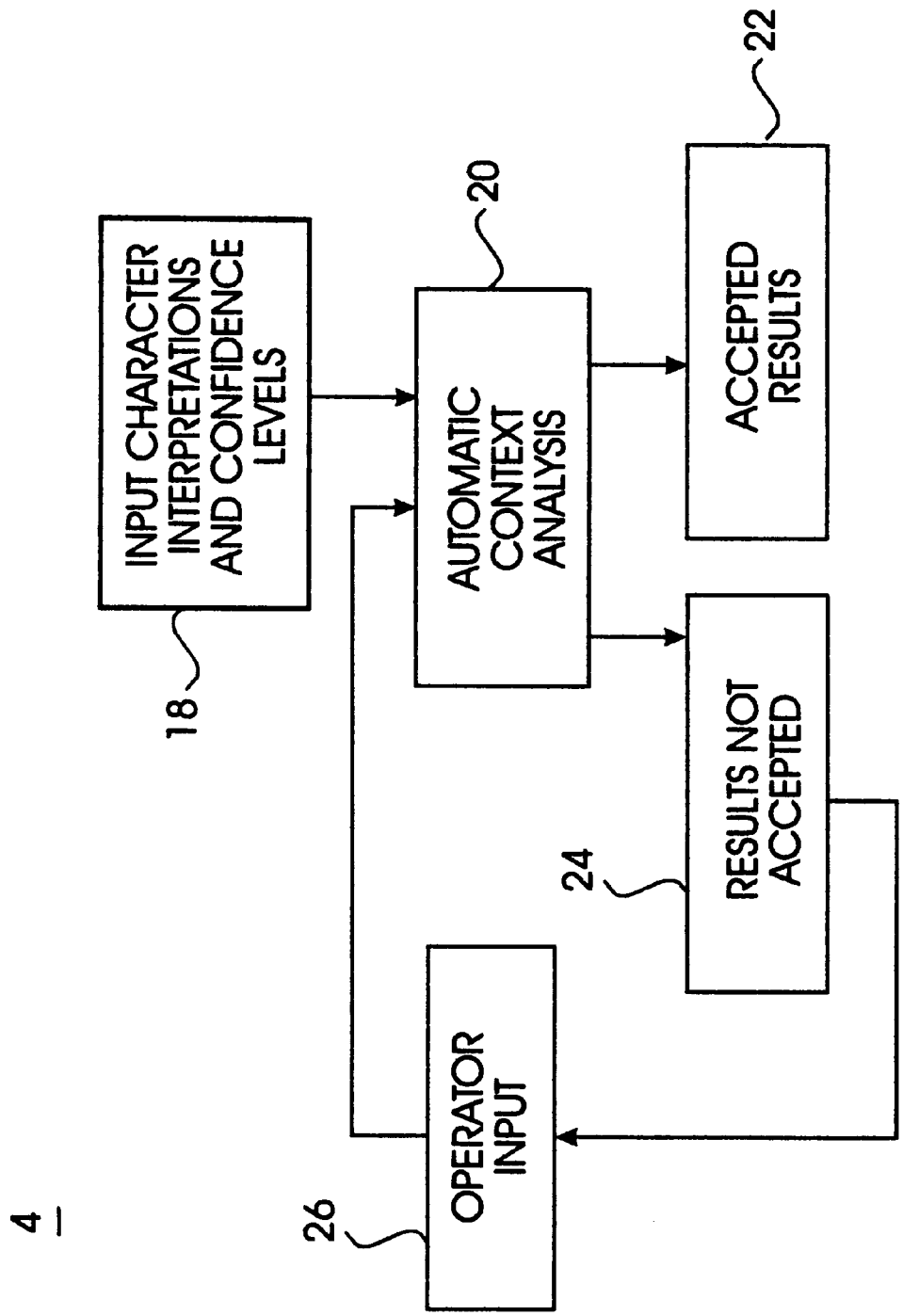
FIG. 3 is a high level flowchart showing a method according to the invention, as practiced by the system of FIGS. 1 and 2

FIG. 3 is a high-level flowchart that shows the method of the invention, employing context analysis and operator input alternatively, on the same batch of documents. After character recognition by the recognizer 2, the context analyzer 4 receives (step 18) and processes (step 20) the fields, to determine which are good enough to expect resolution. This will accept (step 22) as many fields as possible without any operator intervention.

For some other fields (step 24), the process uses operator input (step 26) to certify the character-level OCR result of (or enter) a certain percentage of the characters so that context analysis may accept some of the remaining fields (repetition of step 20).

A PREFERRED EMBODIMENT OF THE INVENTION

Figure 4:
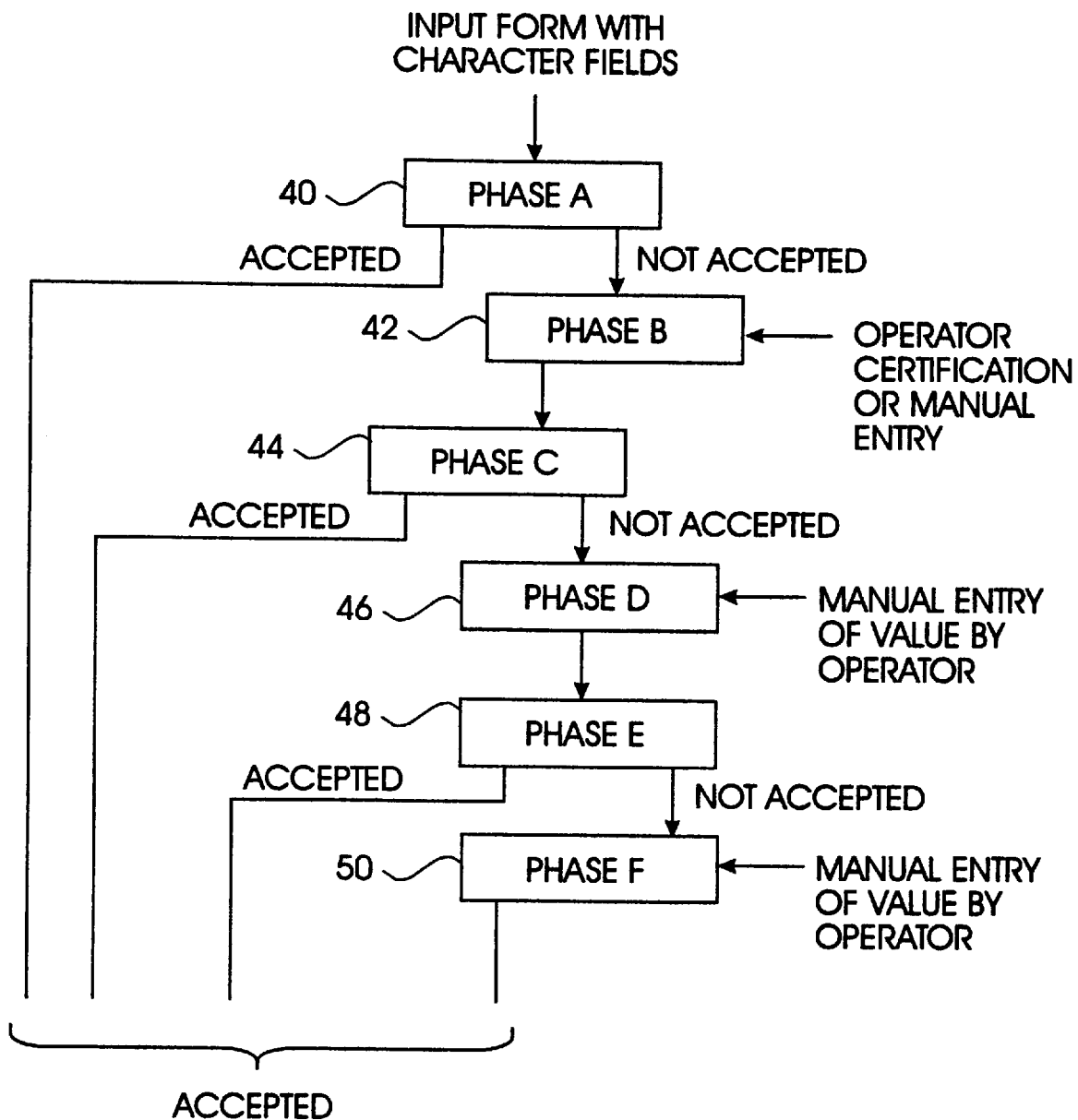
FIG. 4 is a more detailed flowchart, showing operation of a particular embodiment of the method of the invention in terms of a sequence of phases, which are described in the specification.
Figure 5:
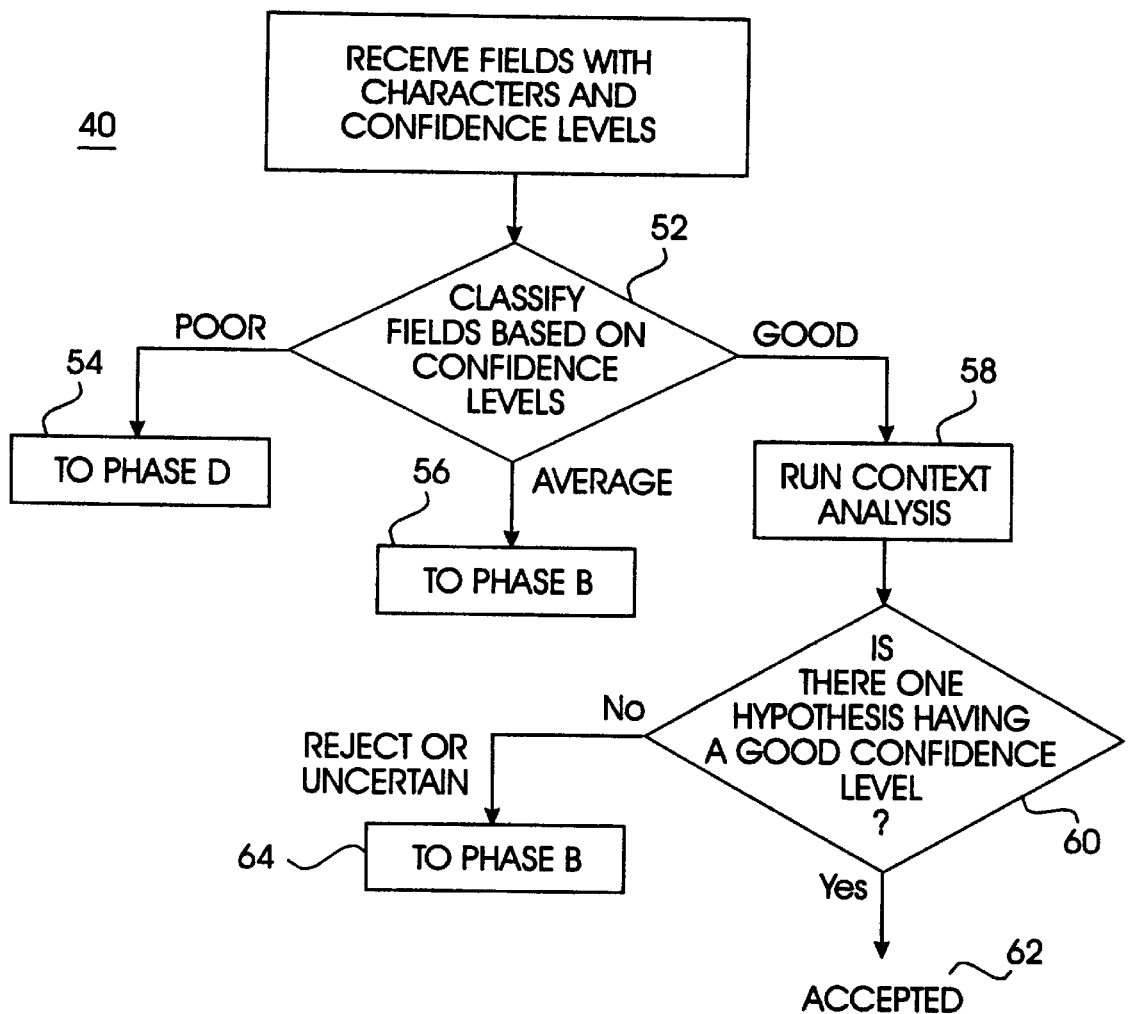
FIGS. 5, 6, 7, 8, 9, and 10 are still more detailed flowcharts, showing details of the phases of FIG. 4.
Figure 6:
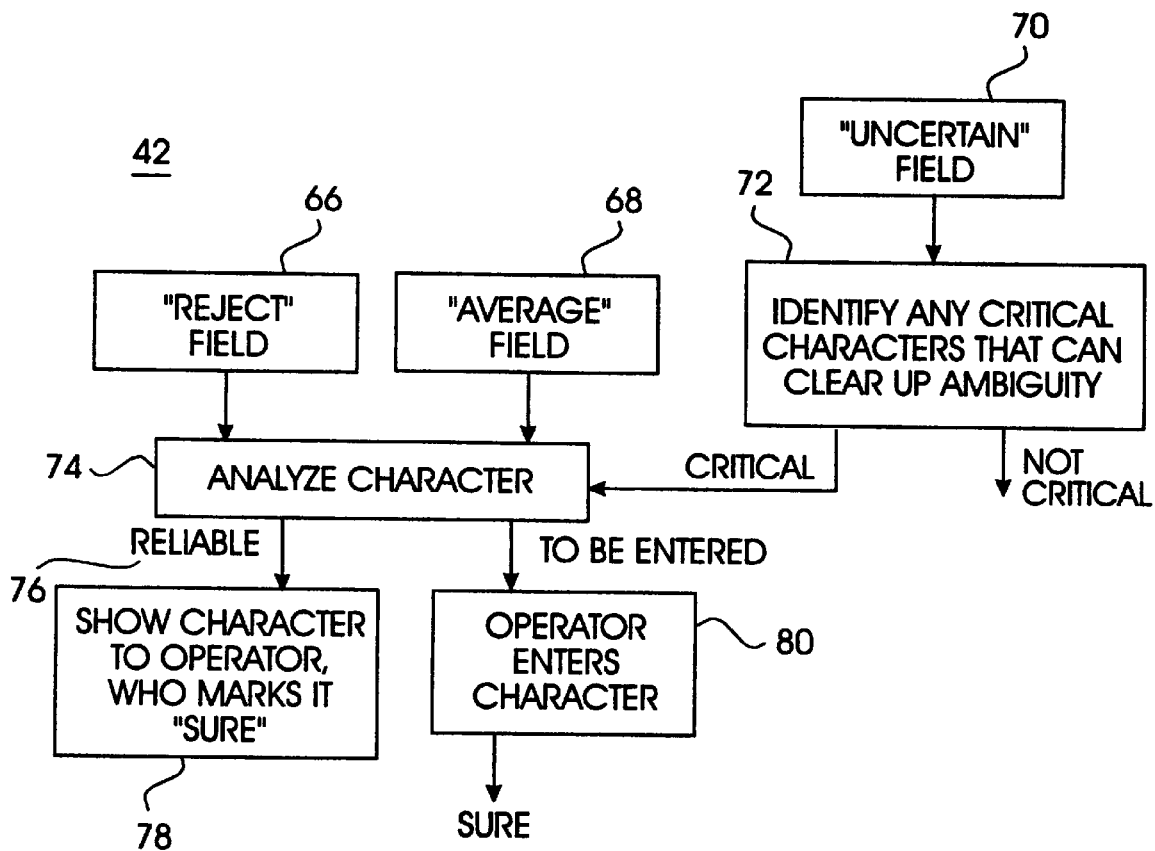
Figure 7:
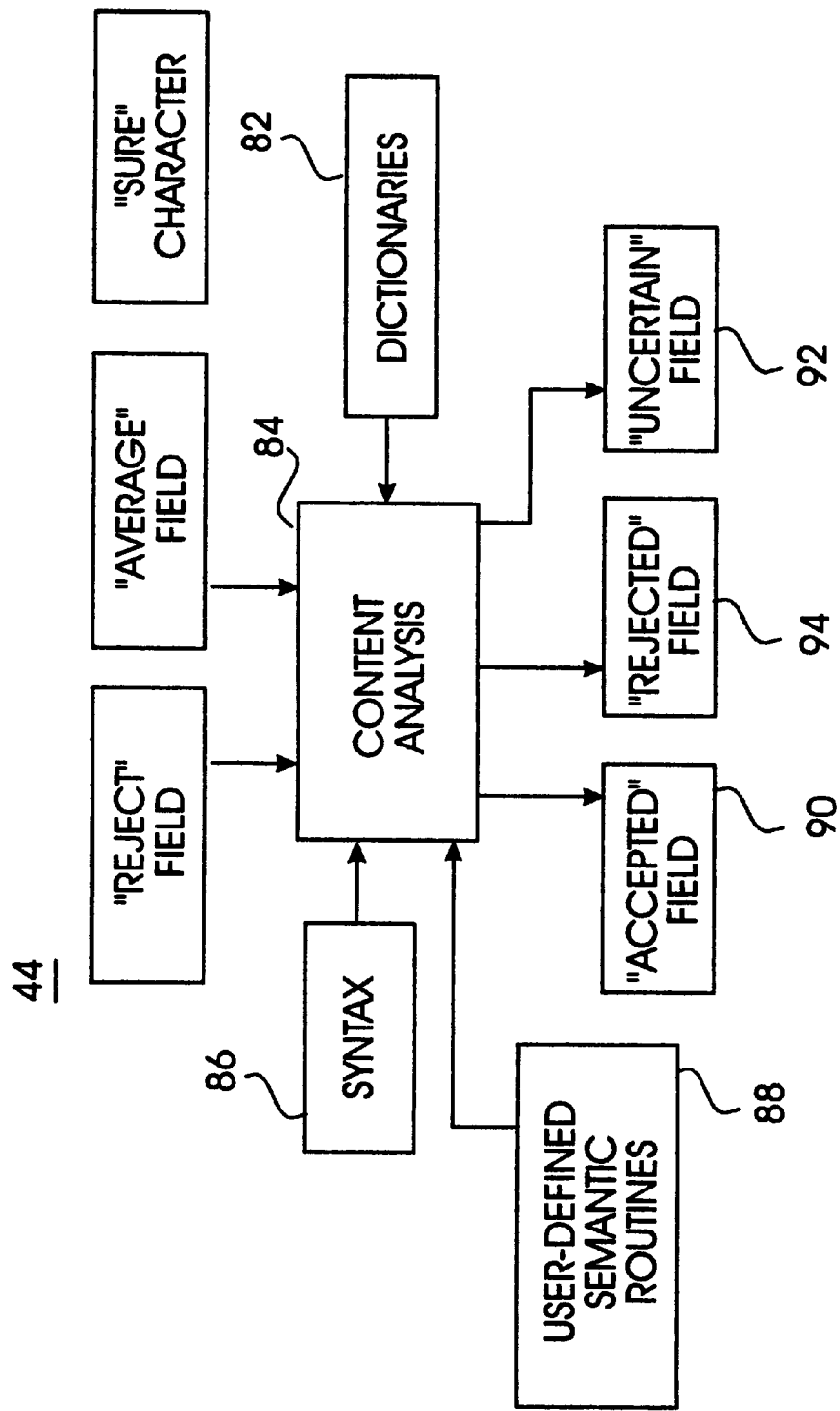
Figure 8:
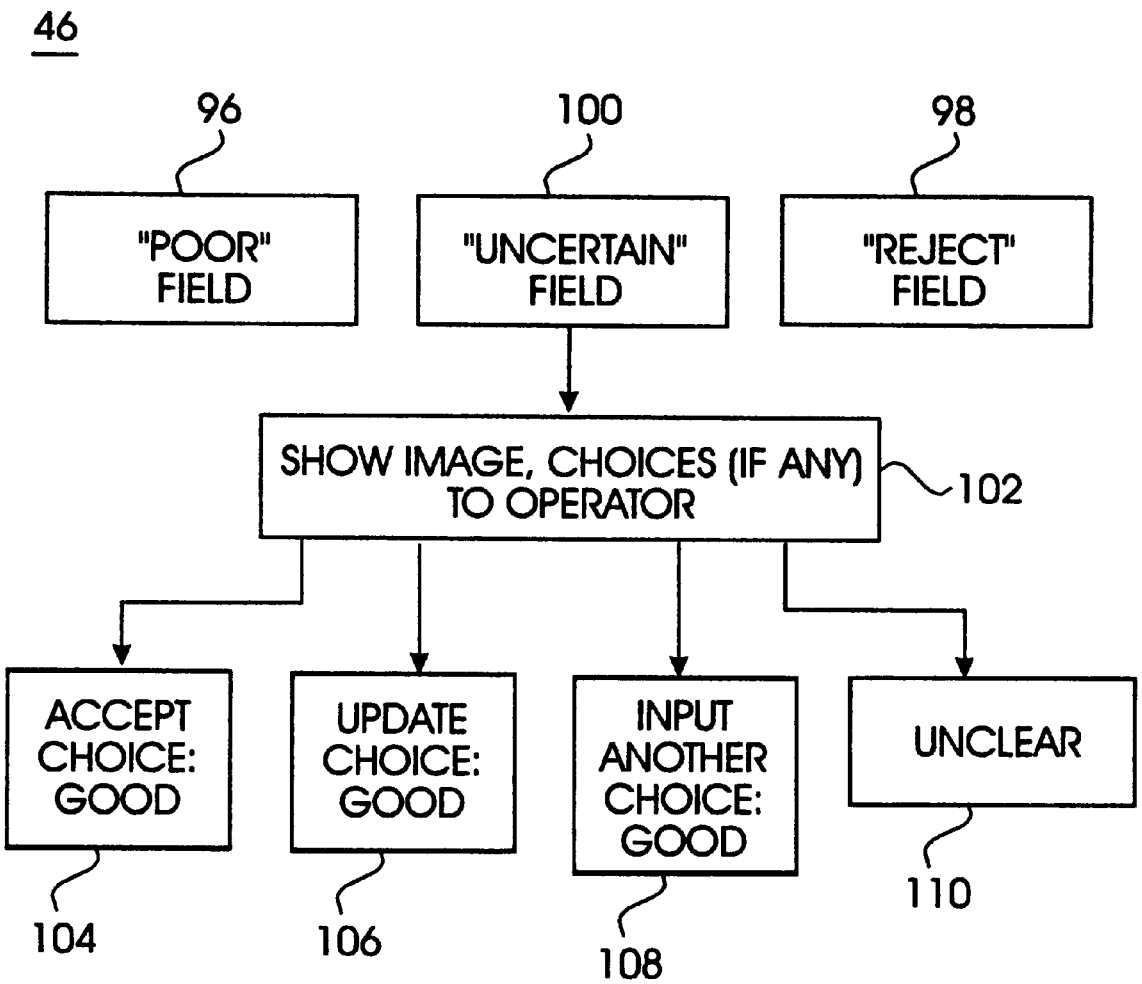
Figure 9:
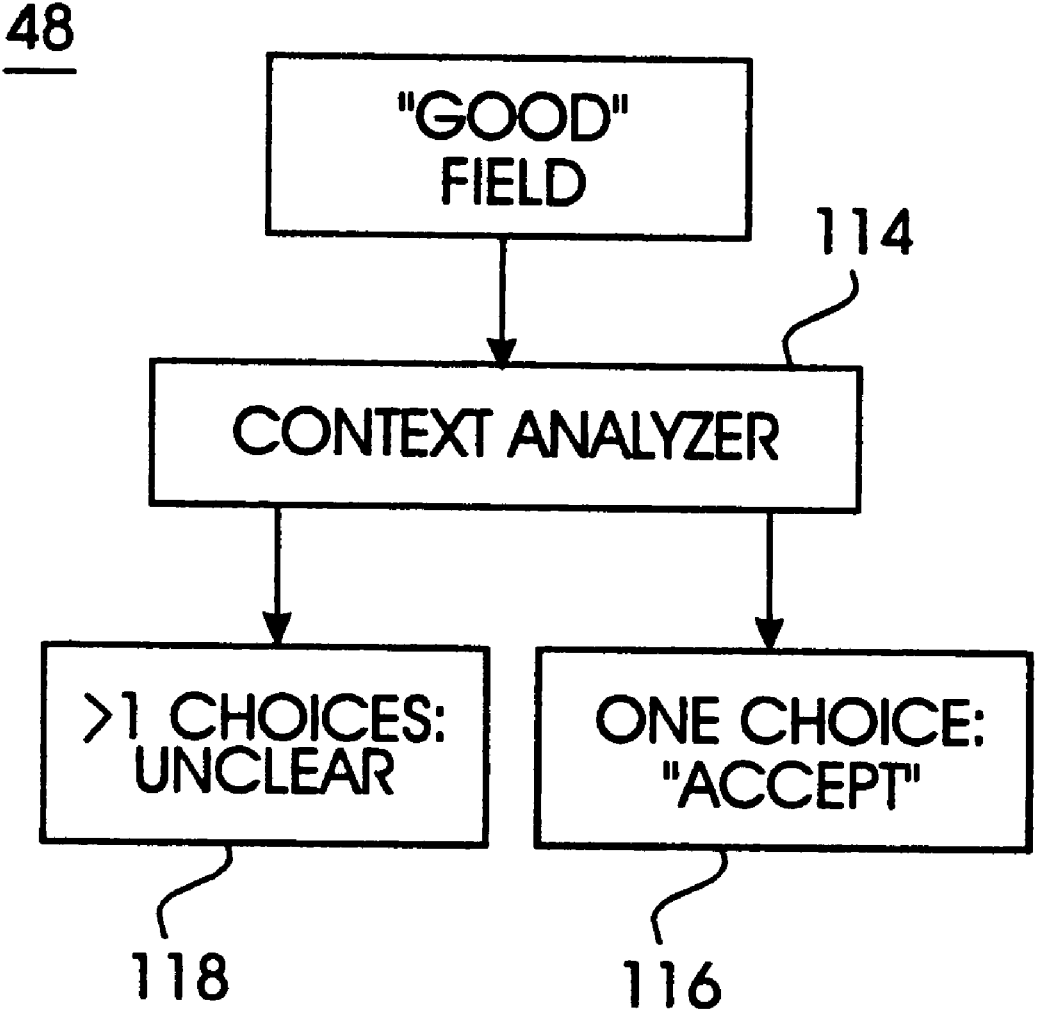
Figure 10:
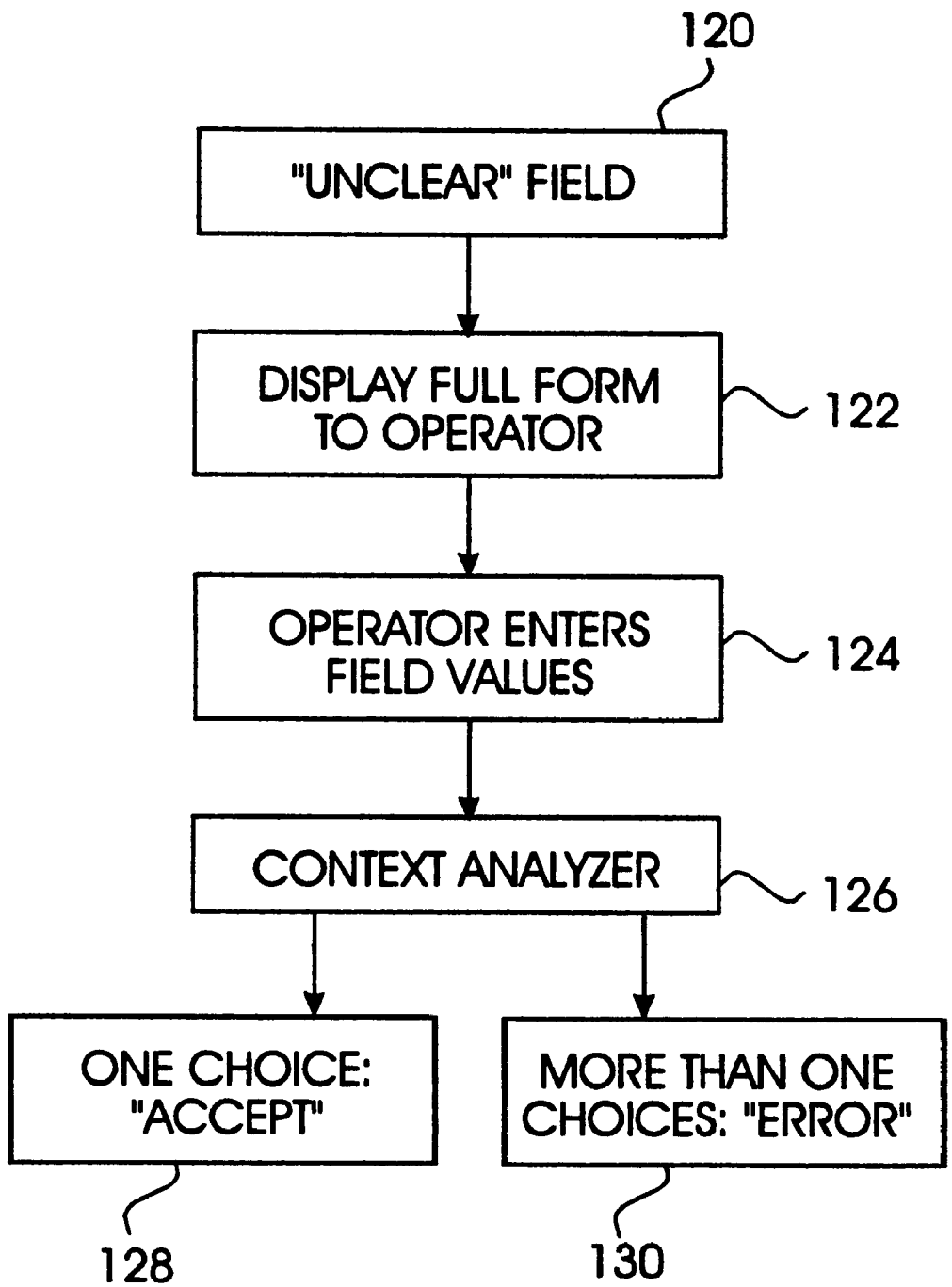

Referring now to FIG. 4, a preferred embodiment of the method of the invention, i.e., of the functionality of the system 4 of FIG. 1, will be described in detail. The system 4 performs a sequence of iterations, described as a sequence of phases. Initially, a summary of what each phase does is given, in high-level pseudocode form:

Phase A (step 40) (computation intensive):
   for each form
      recognize fields
      apply context
      mark some fields as ACCEPTED
Phase B (step 42) (operator-assisted)
   for characters in non ACCEPTED fields
      certify characters or enter them manually
Phase C (step 44) (computation intensive)
   for each form
      apply context to non accepted fields
      mark some more fields as ACCEPTED
Phase D (step 46) (operator-assisted)
   for each non accepted field
      show field
         accept displayed value
         choose one of several displayed values
         enter a displayed value
Phase E (step 48) (computation intensive)
   for each form
      apply context to fields that are not ACCEPTED
      mark more fields as ACCEPTED
Phase F (step 50) (operator-assisted)
   for each form with non accepted fields
      show full form and enter not yet accepted fields
      run context on them for final acceptance Note that it is an option to run Phases D, E, and F as three separate phases or as a single operator-assisted phase, since context analysis at this point is very fast.

Each phase stores its intermediate results in a workspace. The user can specify parameters that influence the process. Most of these parameters are confidence thresholds.

A detailed description of the various phases will now be given:

Phase A

The character recognizer is invoked for all fields. Results are saved in the workspace. The process computes the percentage of characters recognized with good confidence. For the purposes of this example, confidence is measured, by a suitable means, according to an arbitrary numerical scale normalized over the range 0–1000. The threshold values discussed below are selected from within this range, for suitability with the particular application. Other confidence measures, which would be known, or would suggest themselves based on this disclosure, to a person of ordinary skill in this field, may also be used in accordance with the invention.

Referring to Step 52, if the confidence value of a recognized character (such as the number or percentage of good characters) is below a threshold value $t_1$, then the field is marked as POOR (step 54). If the value is between the threshold $t_1$ and a larger threshold $t_2$ ($t_1 < t_2$), then the field is marked as AVERAGE (step 56). If the percentage is above the threshold $t_2$, the field is marked as GOOD.

For GOOD fields, the context analyzer 4 is invoked (step 58). If it returns (step 60) an hypothesis with a confidence greater than a threshold $t_3$, while the second hypothesis has a much lesser confidence (at least a differential $t_4$ less than the confidence of the first hypothesis), then the first hypothesis is accepted and the field is marked as ACCEPTED (step 62).

If n hypotheses have confidences above the threshold $t_5$ and are separated from the next best hypothesis by a gap greater than $t_6$, then the n hypotheses are kept as possibilities, and the field is marked as UNCERTAIN. Otherwise, the field is marked as REJECT. See generally step 64.

Note that if a field has no context associated with it, then the context analyzer simply computes the field confidence based on the OCR confidences (with a max slightly less than the maximum 1000, say, 990).

Phase B

This is an operator-assisted phase. The process considers all fields that are marked as AVERAGE (step 68) or REJECT (step 66) and some of the UNCERTAIN fields, and tries to build up more information about characters in order to make a better decision.

For UNCERTAIN fields (step 70), the process determines if there are a very few characters which, if known with certainty, would help to resolve the ambiguity (step 72). For example, the ambiguity between <San Jose Calif., 95120> and <San Jose Calif., 95123> requires only the last character for its resolution. The characters so identified are marked as CRITICAL.

The process then analyzes the OCR results (step 74) for all REJECT and AVERAGE fields, and for these few CRITICAL characters. It marks some of them as RELIABLE (step 76), meaning that they have a very high probability of having been recognized correctly.

A character is judged to be reliable based on criteria such as (i) if it does not come from a split, (ii) if it has a very high confidence, while the next choice has a low confidence, and (iii) if its distance to some template is low.

The process then presents the RELIABLE characters to the operator for certification (step 78), preferably using a conventional carpeting scheme. As a result, a large portion of these characters are marked as SURE. Those characters not so certified are marked as TO_BE_ENTERED.

If less than $t_7$ percent of the characters in a field have been marked as RELIABLE, then some characters spread along the field are also marked as TO-BE-ENTERED, in order to get to a total of $t_7$ percent.

If a field is UNCERTAIN, then the hypotheses are compared, to see if a few characters certified with certainty would resolve the ambiguity. If yes, then these characters are marked as RELIABLE if they satisfy the above criteria, or are marked as TO_BE_ENTERED if they do not.

When all fields have been analyzed, all RELIABLE characters are shown in carpets for certification. Then, all TO_BE_ENTERED characters are shown, side by side, and are entered manually (step 80). When the value is hard to guess, no value is entered. If some CRITICAL characters have been certified or entered, then the process removes the ambiguity and converts the fields into ACCEPT.

After this process, all fields that have failed the first context analysis, and those marked as AVERAGE (not good enough to undergo the analysis), have now a certain number of SURE characters.

Phase C

This process is computation intensive. It invokes the context analyzer on all fields that are REJECT, or AVERAGE. The context analyzer is helped tremendously by the knowledge of SURE characters.

Consider, as an example, the fuzzy search of a dictionary 82, that is, finding the closest entry to a desired word which does not expressly appear in the dictionary. It is known that closeness may be measured in terms of a Euclidean distance based on a vector of parameters. Knowing a good percentage of SURE characters allows for the elimination of dictionary entries that demonstrably do not match the word sought, thereby reducing tremendously the number of dictionary entries that require a distance computation. Doing so reduces the computing time and also the error rate.

A good context analysis technique (step 84) consists of rejecting an entry unless at least a number X of sure characters are present in the entry at roughly the right position. Syntactical (step 86) and semantic (step 88) criteria may be used to assist in this determination.

For example, if a field contains SAN JOSE and is recognized as JAM JSE, and if A, S and E have been certified as SURE, the system will consider the dictionary entries that contain at least (if x=1) 2 out of these 3 characters, roughly in the positions *A***SE. It will consider SAN JOSE, SEATTLE, SANTA FE, and SAN FRANCISCO, but not OAKLAND or NEW YORK.

Note that the use of the word "SURE" is in accordance with its intuitive meaning, but still allows for some mistakes. If the error rate on SURE characters is 0.5%, the probability of rejecting the correct entry based on this technique is a very small 0.000025.

After the context analysis, the results are analyzed as in Phase A, marking some fields that were previously AVERAGE or REJECT as ACCEPT (step 90), UNCERTAIN (step 92), or REJECT (step 94).

Phase D

For all fields that are POOR (step 96), REJECT (step 98), or UNCERTAIN (step 100), the field image is shown to the operator, together with the multiple choices (step 102). The operator can either accept one of the choices offered as the apparently correct one (step 104), select a different one of the choices offered (step 106), or submit a completely new choice (step 108). In these cases, the status is set to GOOD. The operator can also signal that the answer is UNCLEAR (step 110).

Phase E

For fields with status GOOD (step 112), the syntax analyzer is invoked (step 114). It should normally return a single choice. In cases where it does so, the status is set to ACCEPT (step 116). If the analyzer offers other than a single choice, then the field is marked as UNCLEAR (step 118).

Phase F

For any form that contains at least one UNCLEAR field (step 120), the form is displayed (step 122), and the UNCLEAR fields are shown. The data are entered (step 124). Again, the context analyzer is invoked (step 126). If there is no answer or more than one choice, an ERROR status is returned for the field. Otherwise, the status is set to ACCEPT (step 128). By this time, it will usually be the case that all fields have a status of ACCEPT, except for a very few particularly difficult ERRORs, if any (step 130).

HOW MOST COMMON TYPES OF FIELDS ARE HANDLED

Numeric Fields—No Context

This case is expected to occur frequently. It generally covers situations where numeric digits (i.e., a relatively small alphabet of possible symbols) occur in an indeterminate quantity and form, such as in a block or a string.

If the threshold $t_2$ is set very high (say, at the limit 1000), then Phase A will detect few if any GOOD field. The POOR fields will be shown for manual entry.

The AVERAGE ones will have their characters shown for certification or entry. The context analyzer will be invoked (Phases C and/or E), but it will simply compute the field confidence based on the individual characters. Only if all characters were certified or entered, will the field get a confidence of 1000 and be ACCEPTed. Otherwise, the field will be shown for manual verification or entry, together with the POOR ones.

Numeric Fields with Context

This case will also occur frequently. It covers situations having an arithmetic constraint, such as the Zip code example given above, in which a number of digits expected to occur is known, and/or there are known valid and invalid fields (i.e., valid and invalid digit combinations).

The parameter $t_1$ need not be set to a high number, or to a number near the upper limit. If the arithmetic check (Phase A) is powerful, it can return 1000 to force acceptance. If not, it can return a lower value. Depending upon the values of $t_3$ and $t_4$, the field will be ACCEPTed or not. If not, the process will continue (Phase B, etc.).

Numeric or Alpha—with Dictionary Context

In these cases, dictionary constraints can be exploited. Examples are:

City, state, Zip code
Zip code, street name
Name, social security
College name, college address, college phone number
Product code, product name
Company name
etc.

or

First name
Last name
Occupation
etc.

For the first group of examples (common nouns, familiar place names, etc.), tables (dictionaries) exist that provide full coverage of the valid sets of tuples. For the second group (relatively unfamiliar proper nouns, field-specific jargon, etc.), coverage by dictionaries, directories, or other accessible tables is likely to be only partial. Solutions are given for each case.

Alphanumeric—Dictionary with FULL Coverage

Cases covered here are the most common, and also the most important ones. The technique of the invention supports them very efficiently. Depending upon the dictionary, the values of the thresholds $t_3$, $t_4$, $t_5$, and $t_6$ vary, and can be customized in suitable fashion for the particular application being employed.

Alphanumeric—Dictionary with PARTIAL Coverage

Here, the information to be recognized may not be in the dictionary. In addition, a value very close to the one to be recognized may exist in the dictionary. For example, pertaining to proper names, Mendez is in the dictionary, while Mendes is not; or Pinter is in the dictionary, while Pintner is not.

To deal with this situation, $t_3$ is set to the upper value limit of 1000. As a result, the field will never be ACCEPTed by the context analyzer. Verification or entry of all characters will be required.

CONCLUSION

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for correcting and verifying results of an optical character recognition process comprising:
   a) performing said optical character recognition on an image including characters to be recognized;
   b) performing an automatic context analysis on said image;
   c) evaluating results obtained by said automatic context analysis, to identify characters requiring further processing;
   d) performing a user-assisted verification and correction of less than all of said characters identified as requiring further processing, thereby producing a partially recognized image, wherein said user-assisted verification and correction is omitted if a predetermined level of confidence of recognition of said image is reached by said evaluating of said results; and
   e) repeating steps b–d on said partially recognized image until said predetermined level of confidence of recognition of said image is reached by said evaluating of said results.

2. A method as recited in claim 1, wherein the step of performing an automatic context analysis includes identifying characters which satisfy a first predetermined threshold of confidence that the characters are correctly recognized.

3. A method as recited in claim 2, wherein the step of performing an automatic context analysis further includes performing a dictionary lookup on characters which satisfy the first predetermined threshold of confidence.

4. A method as recited in claim 2, wherein the step of performing an automatic context analysis further includes performing a fuzzy search based on the characters which satisfy the first predetermined threshold of confidence.

5. A method as recited in claim 2, wherein the step of performing an automatic context analysis further includes performing a user-assisted verification and correction of characters which satisfy a second predetermined threshold of confidence, so that results satisfy the first predetermined threshold of confidence.

6. A method as recited in claim 5, further comprising the step, executed prior to the step of performing a user-assisted verification and correction of characters which satisfy a second predetermined threshold, of determining that confusion is possible between two possible solutions, both of which may be correct results of verification and correction of the characters which satisfy the second predetermined threshold of confidence.

7. A method as recited in claim 1, wherein the step of performing an automatic context analysis includes identifying characters which satisfy a first predetermined threshold of confidence that the characters are correctly recognized.

8. A method as recited in claim 7, wherein the step of performing a user-assisted verification and correction further includes performing a dictionary lookup on characters which satisfy the first predetermined threshold of confidence.

9. A method as recited in claim 7, wherein the step of performing a user-assisted verification and correction further includes performing a fuzzy search based on the characters which satisfy the first predetermined threshold of confidence.

10. A method as recited in claim 7, wherein the step of performing a user-assisted verification and correction further includes performing a user-assisted verification and correction of characters which satisfy a second predetermined threshold of confidence, so that results satisfy the first predetermined threshold of confidence.

11. A method as recited in claim 10, further comprising the step, executed prior to the step of performing a user-assisted verification and correction, of determining that confusion is possible between two possible solutions, both of which may be correct results of verification and correction of the characters which satisfy the second predetermined threshold of confidence.

12. A method as recited in claim 1, wherein the step of repeating includes temporarily storing intermediate results, between iterations, in a workspace storage medium.

13. A method as recited in claim 1, wherein the step of evaluating the results of the automatic context analysis includes:
   identifying distinct fields within a form; and
   marking as ACCEPTED those of the fields which satisfy a confidence threshold.

14. A method as recited in claim 1, wherein the step of performing a user-assisted verification and correction includes:
   identifying a field whose results are uncertain; and
   identifying a subset of characters of the identified field whose identification would resolve the ambiguity.

15. A method as recited in claim 14, wherein the step of identifying a subset of characters includes:
   identifying two possible valid values for the field which have characters in common; and
   identifying the subset as those characters which the two possible valid values do not have in common.

16. A method as recited in claim 1, wherein the step of performing a user-assisted verification and correction includes:
   presenting the user with a selection of possible choices for characters within a field; and
   allowing the user the options of:
      (i) ratifying a choice selected as the best choice by the system, (ii) selecting one of the selection of choices other than the choice selected by the system as the best, and
(iii) entering a choice different from those within the selection.

17. A system for correcting and verifying results of an optical character recognition process comprising:
    a) means for performing said optical character recognition on an image including characters to be recognized;
    b) means for performing an automatic context analysis on said image;
    c) means for evaluating results obtained by said automatic context analysis, to identify characters requiring further processing;
    d) means for performing a user-assisted verification and correction of less than all of said characters identified as requiring further processing, thereby producing a partially recognized image, wherein said user-assisted verification and correction is omitted if a predetermined level of confidence of recognition said image is reached by said evaluating of said results; and
    e) means for repeating processing performed by means b–d on said partially recognized image until said predetermined level of confidence of recognition of said image is reached by said evaluating of said results.

18. A system as recited in claim 17, wherein the means for performing an automatic context analysis includes means for identifying characters which satisfy a first predetermined threshold of confidence that the characters are correctly recognized.

19. A system as recited in claim 18, wherein the means for performing an automatic context analysis further includes means for performing a dictionary lookup on characters which satisfy the first predetermined threshold of confidence.

20. A system as recited in claim 18, wherein the means for performing an automatic context analysis further includes means for performing a fuzzy search based on the characters which satisfy the first predetermined threshold of confidence.

21. A system as recited in claim 18, wherein the means for performing an automatic context analysis further includes means for performing a user-assisted verification and correction of characters which satisfy a second predetermined threshold of confidence, so that results satisfy the first predetermined threshold of confidence.

22. A system as recited in claim 21, further comprising means, operable prior to operation of the means for performing a user-assisted verification and correction of characters which satisfy a second predetermined threshold, for determining that confusion is possible between two possible solutions, both of which may be correct results of verification and correction of the characters which satisfy the second predetermined threshold of confidence.

23. A system as recited in claim 17, wherein the means for performing an automatic context analysis includes means for identifying characters which satisfy a first predetermined threshold of confidence that the characters are correctly recognized.

24. A system as recited in claim 23, wherein the means for performing a user-assisted verification and correction further includes means for performing a dictionary lookup on characters which satisfy the first predetermined threshold of confidence.

25. A system as recited in claim 23, wherein the means for performing a user-assisted verification and correction further includes means for performing a fuzzy search based on the characters which satisfy the first predetermined threshold of confidence.

26. A system as recited in claim 23, wherein the means for performing a user-assisted verification and correction further includes means for performing a user-assisted verification and correction of characters which satisfy a second predetermined threshold of confidence, so that results satisfy the first predetermined threshold of confidence.

27. A system as recited in claim 26, further comprising means, operable prior to operation of the means for performing a user-assisted verification and correction, for determining that confusion is possible between two possible solutions, both of which may be correct results of verification and correction of the characters which satisfy the second predetermined threshold of confidence.

28. A system as recited in claim 17, wherein the means for repeating includes means for temporarily storing intermediate results, between iterations, in a workspace storage medium.

29. A system as recited in claim 17, wherein the means for evaluating the results of the automatic context analysis includes:
    means for identifying distinct fields within a form; and
    means for marking as ACCEPTED those of the fields which satisfy a confidence threshold.

30. A system as recited in claim 17, wherein the means for performing a user-assisted verification and correction includes:
    means for identifying a field whose results are uncertain; and
    means for identifying a subset of characters of the identified field whose identification would resolve the ambiguity.

31. A system as recited in claim 30, wherein the means for identifying a subset of characters includes:
    means for identifying two possible valid values for the field which have characters in common; and
    means for identifying the subset as those characters which the two possible valid values do not have in common.

32. A system as recited in claim 17, wherein the means for performing a user-assisted verification and correction includes:
    means for presenting the user with a selection of possible choices for characters within a field; and
    means for allowing the user the options of:
    (i) ratifying a choice selected as the best choice by the system,
    (ii) selecting one of the selection of choices other than the choice selected by the system as the best, and
    (iii) entering a choice different from those within the selection.

33. A computer program product, for use with a computer system, for causing the computer system to correct and verify results of an optical character recognition process, the computer program product comprising:
    a) a computer-readable medium;
    b) means, provided on the computer-readable medium, for directing the computer system to perform said optical character recognition on an image including characters to be recognized;
    c) means, provided on the computer-readable medium, for directing the computer system to perform an automatic context analysis on said image;
    d) means, provided on the computer-readable medium, for directing the computer system to evaluate results obtained by said automatic context analysis performing means, to identify characters requiring further processing;

e) means, provided on the computer-readable medium, for directing the computer system to perform a user-assisted verification and correction of less than all of said characters identified as requiring further processing, thereby producing a partially recognized image, wherein said user-assisted verification and correction means is bypassed if a predetermined level of confidence of recognition of said image is reached by said evaluating means; and f) means, provided on the computer-readable medium, for directing the computer system to repeat processing performed by means c–e on said partially recognized image until said predetermined level of confidence of recognition of said image is reached by said evaluating means.

34. A computer program product as recited in claim 33, wherein the means for directing to perform an automatic context analysis includes means, provided on the computer-readable medium, for directing the computer system to identify characters which satisfy a first predetermined threshold of confidence that the characters are correctly recognized.

35. A computer program product as recited in claim 34, wherein the means for directing to perform an automatic context analysis further includes means, provided on the computer-readable medium, for directing the computer system to perform a dictionary lookup on characters which satisfy the first predetermined threshold of confidence.

36. A computer program product as recited in claim 34, wherein the means for directing to perform an automatic context analysis further includes means, provided on the computer-readable medium, for directing the computer system to perform a fuzzy search based on the characters which satisfy the first predetermined threshold of confidence.

37. A computer program product as recited in claim 34, wherein the means for directing to perform an automatic context analysis further includes means, provided on the computer-readable medium, for directing the computer system to perform a user-assisted verification and correction of characters which satisfy a second predetermined threshold of confidence, so that results satisfy the first predetermined threshold of confidence.

38. A computer program product as recited in claim 37, further comprising means, provided on the computer-readable medium, operable prior to operation of the means for directing to perform a user-assisted verification and correction of characters which satisfy a second predetermined threshold, for directing the computer system to determine that confusion is possible between two possible solutions, both of which may be correct results of verification and correction of the characters which satisfy the second predetermined threshold of confidence.

39. A computer program product as recited in claim 33, wherein the means for directing to perform an automatic context analysis includes means, provided on the computer-readable medium, for directing the computer system to identify characters which satisfy a first predetermined threshold of confidence that the characters are correctly recognized.

40. A computer program product as recited in claim 39, wherein the means for directing to perform a user-assisted verification and correction further includes means, provided on the computer-readable medium, for directing the computer system to perform a dictionary lookup on characters which satisfy the first predetermined threshold of confidence.

41. A computer program product as recited in claim 39, wherein the means for directing to perform a user-assisted verification and correction further includes means, provided on the computer-readable medium, for directing the computer system to perform a fuzzy search based on the characters which satisfy the first predetermined threshold of confidence.

42. A computer program product as recited in claim 39, wherein the means for directing to perform a user-assisted verification and correction further includes means, provided on the computer-readable medium, for directing the computer system to perform a user-assisted verification and correction of characters which satisfy a second predetermined threshold of confidence, so that results satisfy the first predetermined threshold of confidence.

43. A computer program product as recited in claim 42, further comprising means, provided on the computer-readable medium, operable prior to operation of the means for directing to perform a user-assisted verification and correction, for directing the computer system to determine that confusion is possible between two possible solutions, both of which may be correct results of verification and correction of the characters which satisfy the second predetermined threshold of confidence.

44. A computer program product as recited in claim 33, wherein the means for directing to repeat includes means, provided on the computer-readable medium, for directing the computer system to temporarily store intermediate results, between iterations, in a workspace storage medium.

45. A computer program product as recited in claim 33, wherein means for directing to evaluate the results of the automatic context analysis includes:

means, provided on the computer-readable medium, for directing the computer system to identify distinct fields within a form; and means, provided on the computer-readable medium, for directing the computer system to mark as ACCEPTED those of the fields which satisfy a confidence threshold.

46. A computer program product as recited in claim 33, wherein the means for directing to perform a user-assisted verification and correction includes:

means, provided on the computer-readable medium, for directing the computer system to identify a field whose results are uncertain; and means, provided on the computer-readable medium, for directing the computer system to identify a subset of characters of the identified field whose identification would resolve the ambiguity.

47. A computer program product as recited in claim 46, wherein the means for directing to identify a subset of characters includes:

means, provided on the computer-readable medium, for directing the computer system to identify two possible valid values for the field which have characters in common; and means, provided on the computer-readable medium, for directing the computer system to identify the subset as those characters which the two possible valid values do not have in common.

48. A computer program product as recited in claim 33, wherein the means for directing to perform a user-assisted verification and correction includes:

means, provided on the computer-readable medium, for directing the computer system to present the user with a selection of possible choices for characters within a field; and means, provided on the computer-readable medium, for directing the computer system to allow the user the options of:

(i) ratifying a choice selected as the best choice by the system,
(ii) selecting one of the selection of choices other than the choice selected by the system as the best, and
(iii) entering a choice different from those within the selection.

49. A method as recited in claim 1, wherein said repeating step alternates said user assisted verification and said automatic context analysis on a given field of said image.

50. A method as recited in claim 1, wherein said step of performing a user-assisted verification comprises a step of requiring user input on critical characters of said characters.

51. A system as recited in claim 17, wherein said repeating means alternates said user assisted verification and said automatic context analysis on a given field of said image.

52. A system as recited in claim 17, wherein said means for performing a user-assisted verification comprises means for requiring user input on critical characters of said characters.

53. A computer program product as recited in claim 33, wherein said means for directing the computer system to repeat steps alternates said user assisted verification and said automatic context analysis on a given field of said image.

54. A computer program product as recited in claim 33, wherein said means for directing the computer system to perform a user-assisted verification and correction comprises means, provided on the computer-readable medium, for requiring user input on critical characters of said characters.

* * * * *